(12) United States Patent
Roach et al.

(10) Patent No.: US 7,181,090 B2
(45) Date of Patent: Feb. 20, 2007

(54) IMAGE CHARACTERIZATION

(75) Inventors: Matthew J Roach, Glamorgan (GB); Mark Pawlewski, Ipswich (GB)

(73) Assignee: British Telecommunications public limited company, London (GB)

( * ) Notice: Subject to any disclaimer, the term of this patent is extended or adjusted under 35 U.S.C. 154(b) by 722 days.

(21) Appl. No.: 10/399,114

(22) PCT Filed: Nov. 8, 2001

(86) PCT No.: PCT/GB01/04962

§ 371 (c)(1), (2), (4) Date: Apr. 16, 2003

(87) PCT Pub. No.: WO02/39386

PCT Pub. Date: May 16, 2002

(65) Prior Publication Data

US 2004/0098388 A1    May 20, 2004

(30) Foreign Application Priority Data

Nov. 10, 2000   (EP)   ................................. 00310047

(51) Int. Cl.
G06K 9/32    (2006.01)
G06T 13/00   (2006.01)

(52) U.S. Cl. ...................... 382/294; 345/473

(58) Field of Classification Search ............... 382/162, 382/173, 250, 274, 280, 284, 293, 294, 298, 382/305; 345/473, 589
See application file for complete search history.

(56) References Cited

U.S. PATENT DOCUMENTS 3,638,215 A *  1/1972  Payne ...................... 345/156
5,642,111 A *  6/1997  Akagiri ..................... 341/50
6,246,050 B1 * 6/2001  Tullis et al. .......... 250/231.13

* cited by examiner

Primary Examiner—Kanjibhai Patel
(74) Attorney, Agent, or Firm—Nixon & Vanderhye P.C.

(57) ABSTRACT

A method of analysing a sequence of images, for example a sequence of images from a video signal, in which the amount the image changes between two images in a sequence is used to classify the sequence as being either a cartoon or a non cartoon sequence.

15 Claims, 5 Drawing Sheets

IMAGE CHARACTERIZATION

This application is the US national phase of international application PCT/GB01/04962 filed 8 Nov. 2001 which designated the U.S.

BACKGROUND

1. Technical Field

This invention relates to a method of and apparatus for characterising a sequence of images. One aspect of the invention relates to a method of and apparatus for determining whether a sequence images, such as a sequence of frames of a video signal, represents an animated cartoon.

2. Related Art

With the growing availability of online data, provision of hundreds or even thousands of data channels by an information provider causes problems of content management and verification, as manual checking of every piece of data becomes infeasible. For image data, there is increasing interest in techniques for automated image interpretation and classification. Automated image interpretation and classification can provide indexing, cataloging and searching of still image or moving image databases. Image interpretation and classification can be done either by the service provider or by the service receiver.

One method of image classification is to analyse the content of each individual frame. Another method is to comparing images from a sequence of frames with each other.

BRIEF SUMMARY

According to the present invention there is provided a method for characterising a sequence of images represented by a plurality of pixels whose intensity and/or colour can change with time, each pixel having a pixel value indicative of the intensity and/or colour of the pixel, the method comprising the steps of:

(i) determining the temporal rate of change of the pixel value for each pixel of a group of pixels;

(ii) combining the determined rates of change for each of the pixels so as to provide a combined rate of change value for the sequence of images, the combined rate of change having a plurality of temporal frequency components associated therewith;

(iii) determining the size of at least some of the temporal frequency components associated with the combined rate of change; and, (iv) characterising the sequence of images in dependence upon the sizes of the frequency components.

The term "intensity" will be understood to include luminosity, strength or other value indicative of the brightness with which a pixel when displayed can be perceived by the human eye.

It has been appreciated that image sequences displaying different types of subject matter have different temporal frequency components. For example, the amount of movement in a sequence of images has been found to affect the extent to which different temporal components are present. Thus, sequence of images showing a stationary person talking will normally have frequency components whose amplitudes relative to one another are very different to those of a sequence of images showing a violent scene in a film. Hence by obtaining at least some of the temporal frequency components in a sequence of images, it is possible to characterise the sequence of images.

In particular, it has been found that the frequency components of a sequence of images in an animated cartoon are very different from which are not from an animated cartoon. Therefore, in one embodiment, the sequence of images is characterised as being an animated cartoon or not being an animated cartoon. This will facilitate parents to stop children from downloading videos from the Internet or from watching TV programs other than cartoons. However, the method could be used to classify or otherwise characterise a sequence of images. For example, the classification of pornographic images or recognition of particular people could prove useful.

It will be appreciated that the absolute size of the frequency components making up the combined rate of change need not be determined, and that in many situations the only the sizes of the frequency components relative to one another is important. The relative sizes of the different frequency components can then represent a temporal spectrum. Normally, the size of a frequency component will be measured by its amplitude or magnitude.

The rate of change of a pixel value will preferably be the first derivative of the pixel value with respect to time, but the rate of change may be the second or yet higher order derivative of the pixel value with respect to time.

The rates of change may be combined by simply taking the sum of the rates of change, or by taking a weighted average of the rates of change for different pixels.

The group of pixels may be distributed in a spaced apart fashion over an area. Alternatively, the group of pixels may be formed by pixels which neighbour one another.

Preferably the method further comprises the step of partitioning the image into a plurality of subimages; and in which the combining step comprises the sub steps of combining the determined rate of change for the plurality of pixels in a subimage to provide a subimage rate of change; and subsequently combining said subimage rates of change to provide said value.

Preferably the rate of change of the value for each pixel is determined by calculating the difference between the value for a pixel for one image and the value of a corresponding pixel for a previous image.

Preferably the combining step includes the sub step of determining the proportion of pixels in an image of the sequence which have a value which is substantially different from the value of the corresponding pixel in a previous image of the sequence.

The spectrum of the combined rate of change of a plurality of pixels may be determined using a Fourier transform.

A discrete cosine transform may be used to provide a plurality of values which characterise the spectrum.

According to another aspect of the invention there is also provided apparatus for characterising a sequence of images represented by a plurality of pixels, each pixel having a pixel value indicative of its intensity and/or colour, the apparatus comprising: means for determining the temporal rate of change of the pixel value for each pixel of a group of pixels; means for combining the determined rates of change for each of the pixels so as to provide a combined rate of change value for the sequence of images, the combined rate of change having a plurality of temporal frequency components associated therewith; means for determining the size of at least some of the temporal frequency components associated with the combined rate of change; and, means for characterising the sequence of images in dependence upon the sizes of the frequency components.

According to yet another aspect of the invention, there is provided a method for classifying whether a sequence of images represents a cartoon, in which each image comprises a plurality of pixels, each pixel having a value representative of the intensity and/or colour of the pixel, the method comprising the steps of:

for a plurality of pixels in an image, determining the rate of change of the value for each pixel for a plurality of images of a sequence of images;

combining the determined rate of change of the plurality of pixels to provide a combined rate of change value for said plurality of images;

determining the sizes of the frequency components of the combined rate of change value; and classifying the sequence of images in dependence upon said sizes of the frequency components.

According to a further aspect of the invention, there is provided an apparatus for determining whether a signal representing a sequence of images represents an animated cartoon, the apparatus comprising means (71) for determining the rate of change of the value for a pixel in an image, the value being representative of the intensity and/or colour of the pixel;

means (81) for combining the determined rate of change to provide a combined rate of change;

means (77) for determining the sizes of the frequency components of the combined rate of change; and means (80) for classifying the signal in dependence upon said sizes of the frequency components.

Preferably the apparatus further comprises a segmenter (70) for partitioning an image of the sequence into a plurality of subimages.

Preferable the combiner (81) comprises means (72) for determining the proportion of pixels in an image which are substantially different from the value of the corresponding pixel in a previous image of the sequence.

Preferably the apparatus further comprises a discrete cosine transformer (78) for characterising the spectrum.

The invention also includes a data carrier loadable into a computer and carrying instructions for causing the computer to carry out the method of the invention and for enabling a computer to provide the apparatus according to the invention

BRIEF DESCRIPTION OF THE DRAWINGS

An embodiment of the invention will now be described, by way of example only, with reference to the accompanying drawings in which.

DETAILED DESCRIPTION OF EXEMPLARY EMBODIMENTS

Figure 1:
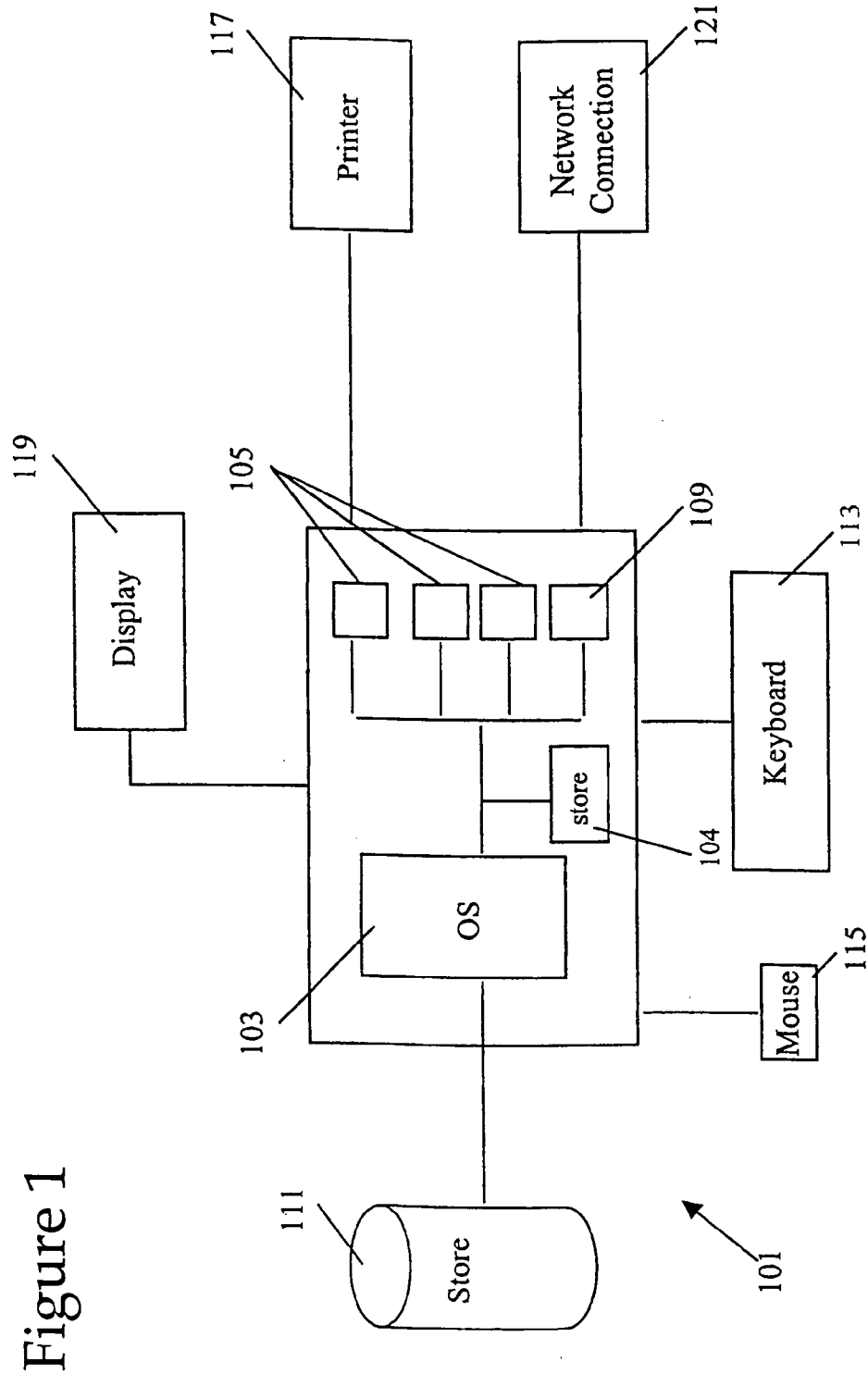
FIG. 1 is a schematic representation of a computer loaded with software embodying the present invention.

FIG. 1 illustrates a conventional computer 101, such as a Personal Computer, generally referred to as a PC, running a conventional operating system 103, such as Windows (a Registered Trade Mark of Microsoft Corporation), and having a number of resident application programs 105 such as a word processing program, a network browser and e-mail program or a database management program. The computer 101 also includes an image sequence classification program 109 that enables a signal representing a sequence of images to be classified according to whether the signal represents an animated cartoon. The program 109 has access to a temporary store 104 for storing program variables during execution of the program 109. The computer 101 is also connected to a conventional disc storage unit 111 for storing data and programs, a keyboard 113 and mouse 115 for allowing user input and a printer 117 and display unit 119 for providing output from the computer 101. The computer 101 also has access to external networks (not shown) via a network card 121.

Figure 2:
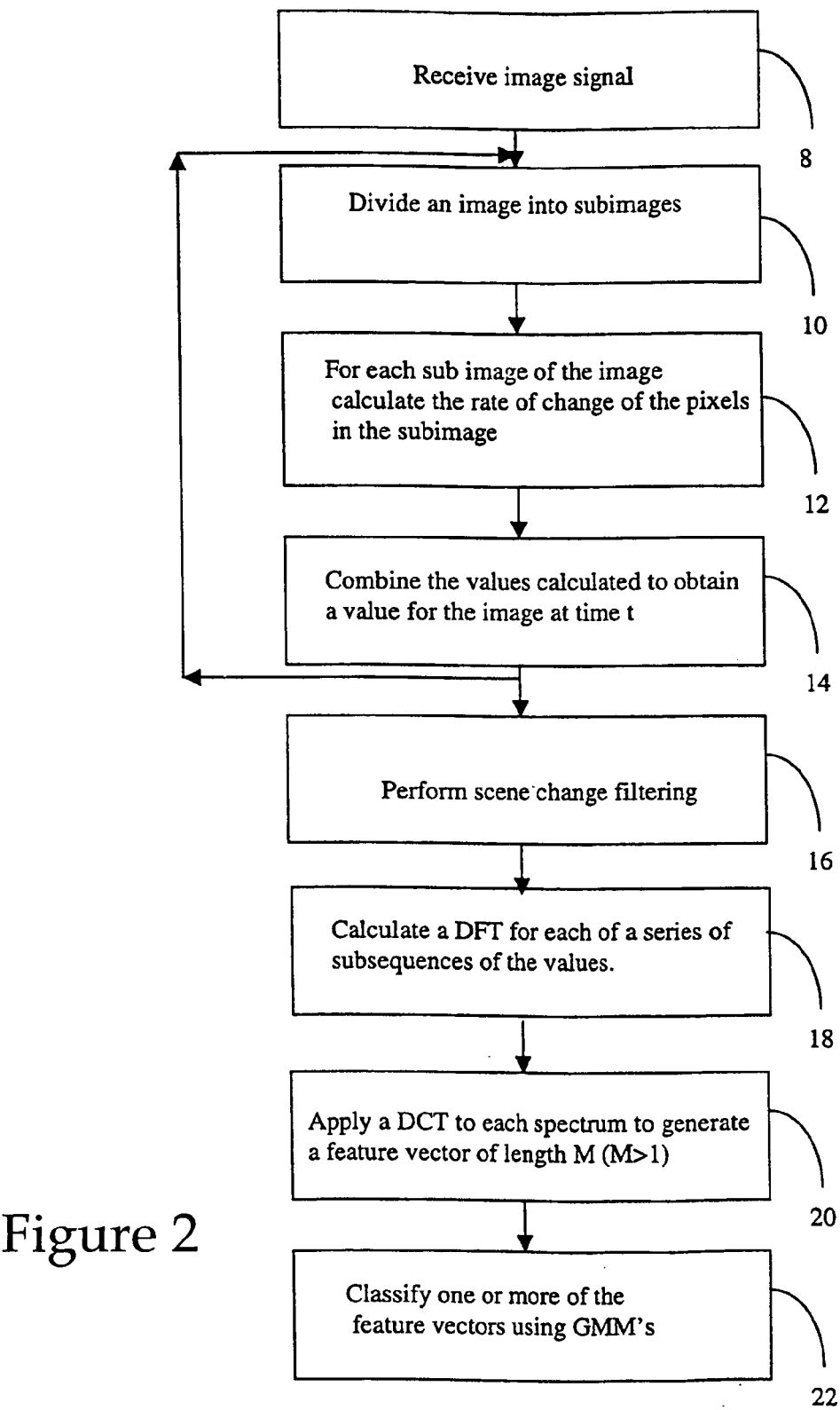
FIG. 2 is a flow chart showing the method steps performed in one embodiment of the invention by the software illustrated in FIG. 1.

As shown in FIG. 2, in accordance with a method of the present invention at step 8 an input signal representing a sequence of images, for example a sequence of frames of video data, each image comprising a plurality of pixels, is received. The received signal has components representing a value in the range 0 to 255 for a red component (R) a blue component (B) and a green component (G) for each of the plurality of pixels which comprise each image in the sequence. At step 10 a current image in the sequence is divided into a plurality of subimages, each subimage representing part of the image. In this embodiment of the invention the image is divided into non-overlapping rectangular subimages of substantially equal size, any difference in size generally being due to rounding the required number of pixels to a whole number. The subimages could equally well be overlapping, of unequal size or of arbitrary shapes. However the subimages should be substantially the same as a corresponding subimage for each image in the sequence.

The red green and blue component values are stored in the temporary store 104 (FIG. 1) for each subimage of the current image. At step 12 the amount by which a pixel value has changed between the current image and a previously received image in the sequence is calculated. In this embodiment of the invention the amount of change between corresponding pixels in different images is calculated between a particular image i and the immediately preceding image in the sequence i.e. the image i−1. However the amount of change could equally well be calculated between the current image and any previously received image in the sequence, i.e. the image i−n, in order to determine the rate of change of the value of the pixels.

At step 14 the respective rates of change of the pixel values for the subimage are combined with each other, and with the values calculated for other subimages as follows. The rate of change of the value of pixels is used to determine a percentage of pixels which have a substantially different value from the corresponding pixel in a previous image in the sequence.

The percentage of changed pixels is calculated as follows:
For each pixel in the subimage, if $|R(x,y)_t - R(x,y)_{t-1}| + |G(x,y)_t - G(x,y)_{t-1}| + |B(x,y)_t - B(x,y)_{t-1}| >$ threshold then dsub=dsub+1.

Where R(x,y)t is the value of the red component for the pixel at position (x,y) in the image at time t (the current image in the sequence), $R(x,y)_{t-1}$ is the value of the red component for the pixel at position (x,y) in the image at time t−1 (the previous image in the sequence). Similar notation is used for the green and blue components. dsub is initially set to zero and is used to keep a running total of the number of pixels which are substantially different from corresponding pixels in a previous image in the sequence. In order to calculate a percentage dsub is simply divided by the total number of pixels in the subimage and multiplied by one hundred. threshold is an empirically set value which determines whether one pixel is deemed to have a value which is substantially different from that of another pixel.

It will be appreciated that the rate of change of the pixel value may be obtained from the difference between the pixel value in an image and the pixel value of the same pixel in a subsequent image, without necessarily involving the step of dividing the difference in the pixel value by the time separation of the two images. This may be the case for example when comparing or classifying sequences of images which are formed by images at regular time intervals, in particular if the time interval between the images in the same for the different sequences.

The percentages of changed pixels for all the subimages are then combined in order to provide a combined rate of change value corresponding to a combined measure of the rate of change of pixel values for a particular image. In this embodiment of the invention the percentages are summed. In other embodiments the combined value from each subimage could be weighted, for example, by a weighting value indicating the importance each subimage which may be calculated as described in our co pending European applications number 00302699.4 or 0031262.2

Steps 10 to 14 are repeated for all of the images in the sequence thus providing a sequence of combined rate of change values, each combined rate of change value corresponding to a particular image at a particular time. It is equally possible to calculate rate of change values at times which do not correspond to a particular image in the sequence (for example using interpolation) and it is not necessary to calculate a combined rate of change value for each and every image in the sequence. It will be appreciated that images at the beginning of the sequence will not have a rate of change value calculated if there is no corresponding previous image with which to compare pixels values.

At step 16 scene change filtering is performed. When a scene changes, the value of virtually every pixel in the scene changes significantly. Hence the rate of change value corresponding to a scene change causes a significant 'spike' in the sequence.

Figure 3:
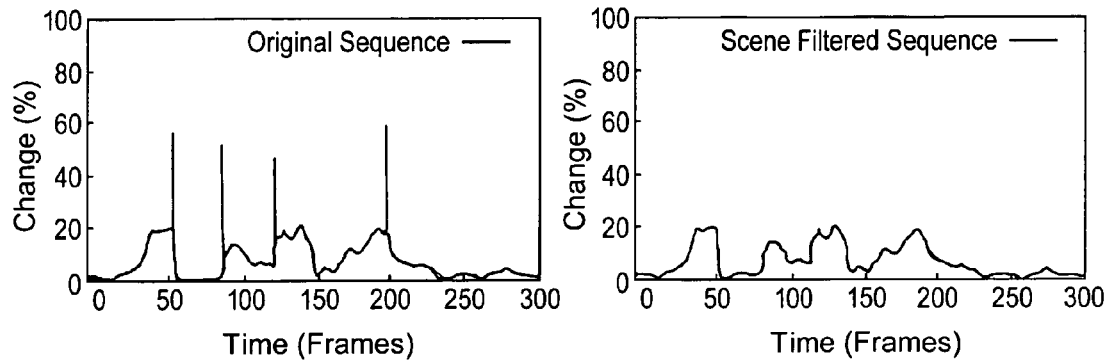
FIG. 3 shows a graph of the percentage of changed pixels both before and after scene change filtering.

An example of this is shown in FIG. 3. In order to remove these spikes any rate of change values above a certain threshold are simply deleted from the sequence.

Figure 4:
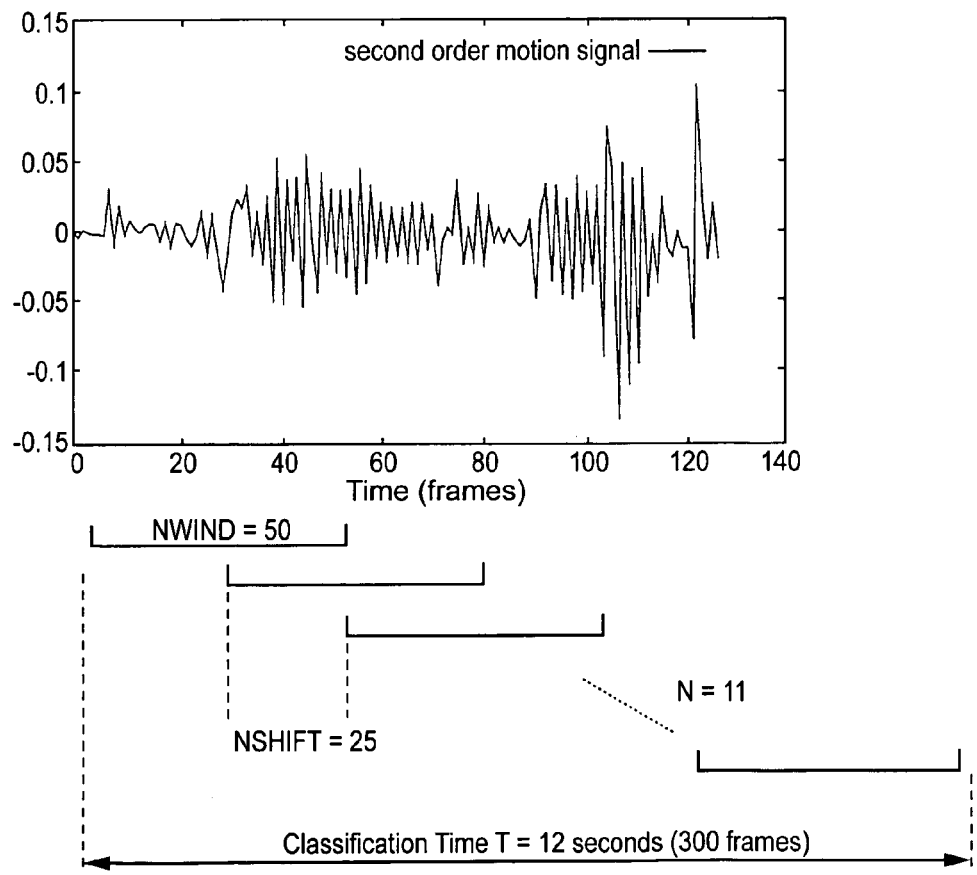
FIG. 4 illustrates how a Discrete Fourier Transform is applied to sequential windows of samples.

After scene changed filtering at step 16, a Discrete Fourier Transform (DFT) is applied to a series of subsequences of the values at step 18. In this embodiment of the invention the DFT is applied to a subsequence comprising 50 values in order to provide a spectrum of the frequencies of the rate of change values. In other embodiments a preprocessing filter, for example a Hamming window, may be applied to the sequence of values prior to calculation of the DFT in order to remove spurious edge effects. FIG. 4 illustrates how the DFT is applied to a subsequence comprising 50 values which overlaps by 25 values with the next subsequence of values to which the DFT is applied.

Figure 5:
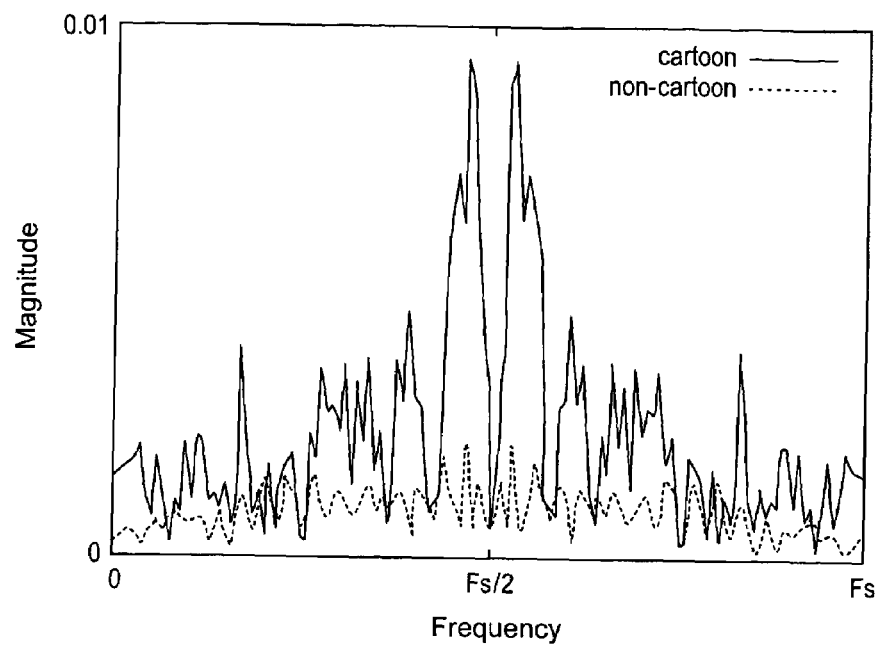
FIG. 5 illustrates the difference between spectrums for a cartoon sequence of images and a non cartoon sequence of images.

At step 20 a Discrete Cosine Transform (DCT) is then applied to each spectrum resulting from the application of the DFT. FIG. 5 shows a spectrum for a cartoon sequence and also for a non-cartoon sequence. It can be seen that the spectrum for the rate of change values for the non-cartoon sequence shows fairly constant frequencies whereas the spectrum for the rate of change values for the cartoon sequence exhibits more high frequencies than low frequencies. Eight DCT coefficients are produced, although more or less could be used as will be discussed later.

Finally, at step 22 eleven DCT coefficients vectors are used to classify the sequence as a cartoon or as a non cartoon sequence. Any one of a number of classifiers could be used. In this embodiment of the invention the DCT coefficient vectors are classified using Gaussian Mixture Models a description of which may be found in D. A. Reynolds, R. C. Rose and M. J. T. Smith "PC-Based TMS320C30 Implementation of the Gaussian Mixture Model Text-Independent Speaker Recognition System, pages 967-973 ICSPAT, DSP Associates 1992.

Figure 6:
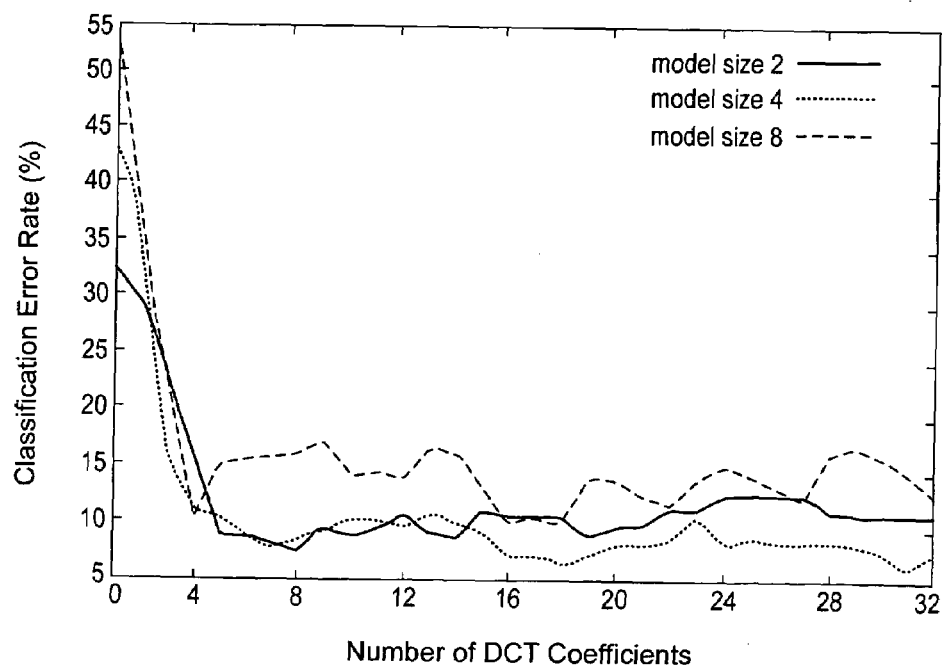
FIG. 6 demonstrates how the number of Discrete Cosine Transform coefficients affects the classification error rate.

FIG. 6 shows how the effectiveness of classification varies in dependence up the number of DCT coefficients used. The first DCT coefficient which provides a measure of the energy of the rate of change values does not provide any useful information for distinguishing between cartoon sequences and non cartoon sequences. The second DCT provides a very useful measure as the performance improves greatly once the second DCT is included in the classification, the performance improves up to eight coefficients and then remains much the same thereafter.

Figure 7:
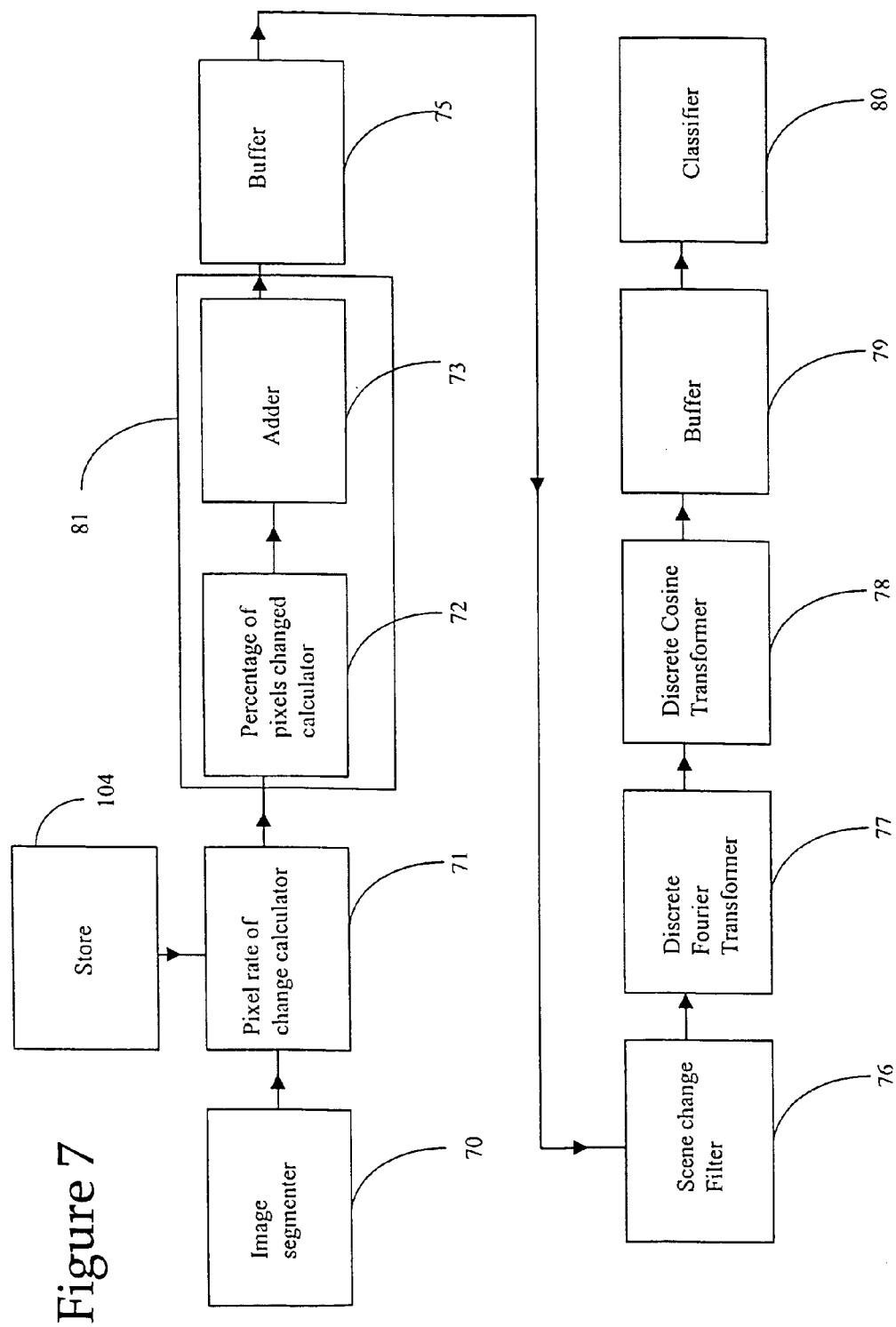
FIG. 7 is a functional block diagram of the program elements that comprise the software indicated in FIG. 1.

As shown in FIG. 7, and referring back for FIG. 2 a classification program 109 according to the invention comprises an image segmenter 70 which performs step 10 of FIG. 2, a pixel rate of change calculator 71, which performs step 12. A combiner 81, which performs step 14, comprises a calculator 72 for determining the percentage of pixels changed in a subimage and an adder 73 for summing the percentages of pixels changed in a plurality of subimages in order to generate a rate of change value for each image. Rate of change values for a plurality of images are stored in a buffer 75. A scene change filter 76 performs step 16 and filters the rate of change values from the buffer 75 in order to remove any spikes in a sequence of the rate of change values caused by a scene change. A discrete Fourier transformer 77, performing step 18 of FIG. 2, is used to provide a spectrum of a series of rate of change values, and then a discrete cosine transformer 78, performing step 20 of FIG. 2, is used to parameterise the resulting spectrum into a feature vector comprising eight values. The feature vectors are stored in a buffer 79, and finally a classifier 80 is used to classify a sequence of feature vectors as resulting from a cartoon sequence of images or as resulting from a non cartoon sequence of images.

In another embodiment of the invention, before the image is divided into subimages, camera motion is allowed for. In order to do so, a test portion of an image is compared with corresponding test portions of another image in a sequence of images. Thus correlation between portions is determined and camera motion may be estimated.

As will be understood by those skilled in the art, the image classification program 109 can be contained on various transmission and/or storage mediums such as a floppy disc, CD-ROM, or magnetic tape so that the program can be loaded onto one or more general purpose computers. The program 109 can also be downloaded over a computer network using a suitable transmission medium.

Whilst the invention has been described with reference to a signal representing an image comprising a plurality of pixels, it will be appreciated that the method may equally well be performed on images for which the original source of the image does not represent the image as a plurality of pixels.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A method for characterising a sequence of images represented by a plurality of pixels whose intensity and/or colour can change with time, each pixel having a pixel value indicative of the intensity and/or colour of the pixel, the method comprising the steps of:
    (i) determining the temporal rate of change of the pixel value for each pixel of a group of pixels;
    (ii) combining the determined rates of change for each of the pixels so as to provide a combined rate of change value for the sequence of images, the combined rate of change having a plurality of temporal frequency components associated therewith;
    (iii) determining the size of at least some of the temporal frequency components associated with the combined rate of change; and,
    (iv) characterising the sequence of images in dependence upon the sizes of the frequency components.

2. A method according to claim 1 further comprising the step of partitioning the image into a plurality of subimages; and in which the combining step (ii) comprises the sub steps of combining the determined rate of change for the plurality of pixels in a subimage to provide a subimage rate of change; and subsequently combining said subimage rates of change to provide said value.

3. A method according to claim 1, in which the rate of change of the value for each pixel is determined by calculating the difference between the value for a pixel for one image and the value of a corresponding pixel for a previous image.

4. A method according to claim 1, in which the combining step includes the sub step of determining the proportion of pixels in an image of the sequence which have a value which is substantially different from the value of the corresponding pixel in a previous image of the sequence.

5. A method according to claim 1, a Fourier transform is used in order to obtain the sizes of the frequency components of the combined rate of change.

6. A method according to claim 5, in which a discrete cosine transform is used to provide a plurality of values which characterise the spectrum.

7. A method according to claim 1, wherein the sequence of images is characterised as either being an animated cartoon or not being an animated cartoon.

8. Apparatus for characterising a sequence of images represented by a plurality of pixels, each pixel having a pixel value indicative of its intensity and/or colour, the apparatus comprising: means for determining the temporal rate of change of the pixel value for each pixel of a group of pixels; means for combining the determined rates of change for each of the pixels so as to provide a combined rate of change value for the sequence of images, the combined rate of change having a plurality of temporal frequency components associated therewith; means for determining the size of at least some of the temporal frequency components associated with the combined rate of change; and, means for characterising the sequence of images in dependence upon the sizes of the frequency components.

9. An apparatus for determining whether a signal representing a sequence of images represents an animated cartoon, the apparatus comprising
    means (71) for determining the rate of change of the value for a pixel in an image, the value being representative of the intensity and/or colour of the pixel;
    means (81) for combining the determined rate of change to provide a combined rate of change;
    means (77) for determining the sizes of the frequency components of the combined rate of change; and
    means (80) for classifying the signal in dependence upon said sizes of the frequency components.

10. An apparatus according to claim 9 further comprising a segmenter (70) for partitioning an image of the sequence into a plurality of subimages.

11. An apparatus according to claim 9, in which the combiner comprises means (72) for determining the proportion of pixels in an image which are substantially different from the value of the corresponding pixel in a previous image of the sequence.

12. An apparatus according to claim 9, further comprising a discrete cosine transformer (78) for characterising the spectrum.

13. A data carrier loadable into a computer and carrying instructions for causing the computer to carry out the method according to claim 1.

14. A data carrier loadable into a computer and carrying instructions for enabling the computer to provide the apparatus according to claim 9.

15. A method for classifying whether a sequence of images represents a cartoon, in which each image comprises a plurality of pixels, each pixel having a value representative of the intensity and/or colour of the pixel, the method comprising the steps of for a plurality of pixels in an image, determining the rate of change of the value for each pixel for a plurality of images of a sequence of images;
    combining the determined rate of change of the plurality of pixels to provide a combined rate of change value for said plurality of images;
    determining the sizes of the frequency components of the combined rate of change value; and
    classifying the sequence of images in dependence upon said sizes of the frequency components.

* * * * *